March 22, 1966  F. J. BURG  3,241,699
BANDED GLASS CONTAINER CONSTRUCTIONS
Filed May 25, 1964
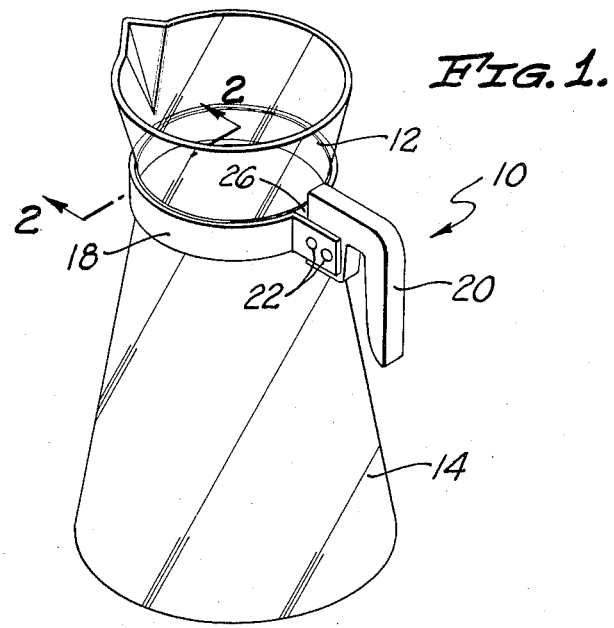
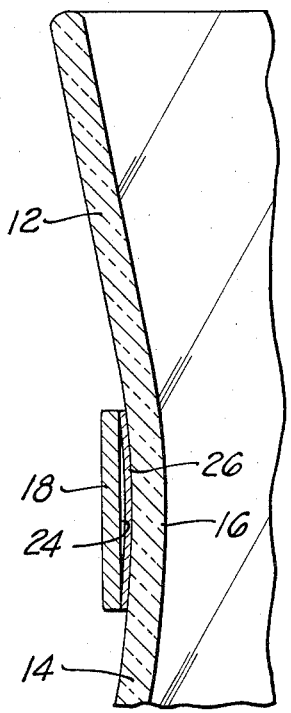
INVENTOR.
FREDERICK J. BURG
BY
EDWARD D. O'BRIAN
ATTORNEY

3,241,699
BANDED GLASS CONTAINER CONSTRUCTIONS
Frederick J. Burg, Bellrose, N.Y., assignor to Salton, Inc., New York, N.Y., a corporation of New York
Filed May 25, 1964, Ser. No. 369,728
1 Claim. (Cl. 215—100)

This invention pertains to the construction of what may be referred to as banded glass containers.

In a number of fields, and especially in the housewares field it is common to provide glass containers which are surrounded by metal bands used for supporting or holding purposes. Normally at least a portion of such a band is spaced from the container with which it is associated. As a consequence of this dirt and other contaminating material may accumulate underneath the band between it and the container. It is virtually impossible to dislodge any such dirt or other material in this location during normal cleaning operations. The presence of such dirt becomes somewhat unsightly; when present it severely limits the desirability of a utensil or housewares type item.

An object of the present invention is to provide new and improved banded glass container constructions. A more specific object of the present invention is to provide a very simple effective type of structure which may be used so as to eliminate the problem of dirt or other contaminants presenting an unsightly appearance between a metal band and a transparent container. These and various other objects of this invention as well as many advantages of it will be more fully apparent from a detailed consideration of the remainder of this specification, the appended claim and the accompanying drawing in which:

FIG. 1 is a perspective view of a part of a coffee extractor or maker utilizing the present invention.

FIG. 2 is a partial cross sectional view taken at line 2—2 of FIG. 1 showing in detail the nature of this invention.

From a careful consideration of this specification it will be realized that the accompanying drawing is primarily intended so as to clearly illustrate for explanatory purposes a presently improved embodiment or form of a construction falling within the scope of this invention. Those skilled in the art of constructing and utilizing banded glass containers of various types will realize that the present invention can be easily and conveniently applied to various other structures than these specific structures shown.

As an aid to understanding this invention it can be stated in essentially summary form that it concerns in combination: A transparent glass container having a band located around its exterior, this band being separated from the principal part of the container by a strip or body of material located on the container between the band and the container, this strip or body of material being of the same color as the band. In this type of construction any dirt coming between what is referred to herein as the strip and the band is effectively hidden from view. It is to be understood that the term "transparent" as used in this summary is used in a broad sense so as to designate a glass container of such a character that a person can see colors through it.

The actual details of the present invention are best more fully explained by referring to the accompanying drawings. In FIG. 1 there is shown a transparent glass container or carafe 10 which forms a principal part of a known type of coffee maker or extractor. This container has upper and lower tapered walls 12 and 14, respectively. These walls 12 and 14 are joined at their smallest portions adjacent to the top of the container 10 by means of a neck section 16. This neck section 16 is surrounded by a known metal band 18 which in turn is secured to a conventional handle 20 by fastening means 22. This band 18 engages the neck section 16 as indicated in FIG. 2.

Because of the configuration of the neck section 16 a portion of the band 18 is spaced from it by a comparatively small space 24. On the surface of the neck 16 directly opposite the band 18 there is located a continuous strip or body of material 26 which is secured to and supported by the neck 16. This material is of the same color as the band 18 and in effect hides the band 18 so that it cannot be directly viewed in the general direction of from within the interior of the container 10.

With this construction any dirt or the like which would normally accumulate between the band 18 and the container 10 within the space 24 is effectively hidden from view by this strip 26. By virtue of the fact that the various parts indicated in the preceding sentence are on the exterior of the container 10 no significant contamination problem arises through the use of the present invention.

Because of the nature of this invention it is to be considered to be limited solely by the appended claim forming a part of this disclosure.

I claim:

In combination with a transparent glass container and a metal band located around a portion of the exterior of said container, the improvement which comprises:
a body of material located between said band and said container, said body of material being secured to said container and being of the same color as said band and being of substantially the same dimension as said band, at least a part of said body of material being spaced from said band so that a person looking towards said band through the interior of said container will see said body of material instead of said band, the body of material engaging the band at the exposed portions of said band and being spaced from said band between said exposed portions.

References Cited by the Examiner
UNITED STATES PATENTS

| 1,859,614 | 5/1932 | Boever | 215—100 |
| 2,809,066 | 10/1957 | Curtis | 294—31.2 |

THERON E. CONDON, *Primary Examiner.*
FRANKLIN T. GARRETT, *Examiner.*